Patented Aug. 11, 1931

1,818,263

UNITED STATES PATENT OFFICE

ALBERT LEO, OF CHICAGO, ILLINOIS

JELLY PREPARATION AND PROCESS OF MAKING THE SAME

No Drawing. Application filed December 22, 1928, Serial No. 328,069. Renewed May 18, 1931.

This invention relates to a jelly preparation particularly adapted for use in the making of jams and jellies.

Heretofore in the making of jams and jellies using pectin in solid form, certain precautions have been necessary in connection with the order of adding the various ingredients making up the jams or jellies. For instance, it is well known that if all of the sugar required for the making of the final product is added at the start, before the addition of the powdered pectin, the subsequently added pectin will not go into solution properly. To avoid this difficulty, it has been common practice either to dissolve the pectin first before the addition of the sugar or else to add a relatively small proportion of the total amount of sugar required together with the pectin, the sugar when added in such smaller quantities serving as a dispersive agent for the pectin. In all such cases, however, some degree of care and skill is required of the operator, or maker of the jams and jellies, if a satisfactory product is to be obtained. Furthermore, the assembly of the separately measured quantities of the different ingredients involves a certain amount of time and labor.

It is therefore an object of this invention to provide a preparation which contains in suitable form all of the ingredients required to cause jellying action when added in definite proportions to unconcentrated fruit juices, or if the preparation is already flavored, to water alone.

It is a further object of this invention to provide a preparation for making jellies and the like that can be marketed in dry, granular form suitable for immediate use in the making of jellies and the like without the addition of further ingredients other than the natural unconcentrated fruit juices or water.

It is a further important object of this invention to provide a preparation by the use of which the making of jams and jellies is considerably simplified and the expenditure of time, labor and care in the jelly making operation reduced to a minimum.

Other and further important objects of this invention will become apparent from the disclosures in the specification and appended claims.

The difficulties heretofore experienced in the making of a jelly preparation in dry form that would contain the correct proportions of sugar, pectin and acid to make a good jelly are due to several reasons. In the first place, if sugar, dry pectin and a solid acid in crystalline or powdered form be added together, the result is a non-homogeneous mixture, due to the non-uniformity in the size of the particles of the various ingredients as well as to differences in their densities. Consequently, the tendency is for the powdered pectin particles to sift through the larger granules of sugar crystals and thus make it impossible to obtain a uniform composition.

Furthermore, as previously pointed out, if the total amount of sugar required to make a jelly is present in the mixture of sugar, pectin and acid, a proper solution of the pectin cannot be obtained for the reason that the sugar will go into solution first and then prevent complete solution of the pectin.

To avoid these difficulties, I now propose to coat each individual sugar crystal with a film of pectin, thereby insuring that the pectin will go into solution before the sugar can start to dissolve. I also prefer to coat the solid acid particles in like manner, partly to insure the solution of the pectin first and partly to prevent the inversion of the sugar should there be moisture present.

My process in its preferred form is substantially as follows:

The pectin or other pectous gum suitable for jelly making is brought into solution if not already in solution. Preferably a pure white pectin obtained from apple or citrus fruit is used. The pectin is preferably in a fairly concentrated solution, say from 3 to 5% pectin content. This pectin solution is then sprayed or atomized into a mass of well agitated sugar, preferably the usual form of granulated cane sugar.

My process can be suitably carried out by blowing a current of heated air upwardly through a mass of sugar crystals with sufficient force to thoroughly agitate the sugar crystals and cause a constant suspension of a part of the sugar crystals in the ascending air current. At the same time, the pectin solution is sprayed against the air suspended sugar crystals and individual coatings of pectin thus formed over the sugar crystals.

The drying of the pectin film proceeds simultaneously until all of the sugar crystals are individually coated with the required amount of pectin and the whole mass is in dry, granular form.

The amount of pectin solution to be used for a given quantity of sugar will obviously depend upon the concentration of the pectin solution and the strength of the pectin. For instance, pectin is ordinarily standardized in accordance with the quantity of sugar by weight that a unit weight of pectin will cause to jellify. One pound of 80 grade pectin, for example, will jellify 80 pounds of sugar, one pound of 100 grade pectin will jellify 100 pounds of sugar and so on. A somewhat less than the full quantity of pectin is sprayed in solution form upon the sugar and the balance of the pectin is sprayed in a similar manner upon the crystals or particles of the acid to be used, as for instance, citric acid, tartaric acid or the like.

The coating of the acid particles with the pectin solution and the drying of the thus coated particles is carried out in a separate operation from that of coating the sugar particles and the dried, coated sugar and acid particles subsequently mixed in the proper proportions.

It will be understood that other methods of spraying the sugar and acid particles with the pectin solution may be employed. For example, the sugar or acid particles may be blown in a stream of heated air in a horizontal direction against an opposing spray of pectin solution, or the sugar particles and acid particles may be separately blown, or allowed to fall by gravity, into a dehydrating chamber and an atomized stream of pectin solution directed against the falling particles.

The final product of any of the above described processes is a mixture of sugar, pectin, and acid in a dry granular form, suitable for immediate use in the preparation of jams and jellies. All that is necessary to make a satisfactory jelly, is to add a measured quantity of the jelly preparation to an equal volume of unconcentrated fruit juices, or if the jelly preparation has already been flavored, to an equal volume of water and bring the solution thus formed to approximately its boiling point. The pectin, being on the outside of the sugar and acid particles in film form must necessarily go into solution first, so that no complication arising from incompletely dissolved pectin can arise.

On the other hand, if the same quantities and proportions of ingredients were employed in the usual manner of jelly making, the simultaneous addition of the separate ingredients would not result in a jelly, owing to the inability of putting the solid pectin into solution in the presence of the sugar. It will be appreciated that such a simple procedure as is made possible using my jelly preparation results in a considerable saving in time, labor and in care, since there are no individual weighings or measurings of the various ingredients necessary.

Furthermore, my jelly preparation can be marketed as a household staple article, easily handled in bulk and not subject to deterioration.

While my invention contemplates the separate coating of the sugar and acid particles with pectin and the subsequent mixture of these ingredients in the proper proportions, it will be appreciated that the pectin coated sugar or pectin coated acid have each a separate usefulness apart from their association in the mixture.

I am aware that numerous details of the process may be varied through a wide range without departing from the principles of this invention, and I, therefore, do not purpose limiting the patent granted hereon otherwise than necessitated by the prior art and the presented claims.

I claim as my invention:

1. A jelly preparation, comprising a mixture of sugar, an edible acid in solid form, and a pectous substance, the sugar and acid particles being individually coated with said pectous substance.

2. A jelly preparation, comprising a mixture in granular form of sugar, a fruit acid and pectin, the sugar and acid each being enveloped by a coating of pectin over the individual, separate particles thereof.

3. A jelly preparation, comprising a mixture in granular form of sugar, a fruit acid and pectin, the sugar and acid each being enveloped by a coating of pectin over the individual, separate particles thereof, the proportion of sugar, acid and pectin being such that when the mixture is added to an equal volume of water and heated approximately to the boiling point a jelly will result upon cooling.

4. A jelly preparation, consisting of a mixture in granular form of sugar, citric acid and pectin, the individual crystals of sugar and citric acid being enclosed within an envelope of the pectin.

5. The process of making a jelly preparation, which comprises separately covering individual solid particles of sugar and an edible acid with pectin.

6. The process of making a jelly preparation, which comprises spraying a solution of pectin on sugar and citric acid crystals separately, drying the pectin coated particles and mixing said particles in the proper proportion for jelly making.

In testimony whereof I have hereunto subscribed my name at Chicago, Cook County, Illinois.

ALBERT LEO.